United States Patent
Sipes, Jr. et al.

(10) Patent No.: US 10,277,329 B2
(45) Date of Patent: Apr. 30, 2019

(54) POWER INSERTION DEVICE FOR HYBRID FIBER AND POWER NETWORK

(71) Applicant: Radius Universal LLC, Lynbrook, NY (US)

(72) Inventors: Donald Lee Sipes, Jr., Colorado Springs, CO (US); John David Read, Colorado Springs, CO (US)

(73) Assignee: Radius Universal LLC, Lynbrook, NY (US)

( * ) Notice: Subject to any disclaimer, the term of this patent is extended or adjusted under 35 U.S.C. 154(b) by 206 days.

(21) Appl. No.: 15/262,454

(22) Filed: Sep. 12, 2016

(65) Prior Publication Data

US 2016/0380777 A1    Dec. 29, 2016

Related U.S. Application Data (63) Continuation-in-part of application No. 15/233,312, filed on Aug. 10, 2016, now Pat. No. 10,139,569, and
(Continued)

(51) Int. Cl.
*H04B 10/80* (2013.01)
*H04L 12/10* (2006.01)
(Continued)

(52) U.S. Cl.
CPC ......... *H04B 10/808* (2013.01); *G02B 6/3817* (2013.01); *G02B 6/4246* (2013.01); *G02B 6/4292* (2013.01); *G02B 6/4293* (2013.01); *G02B 6/4416* (2013.01); *H04B 10/073* (2013.01); *H04B 10/077* (2013.01); *H04B 10/272* (2013.01); *H04L 12/10* (2013.01);
(Continued)

(58) Field of Classification Search
None
See application file for complete search history.

(56) References Cited

U.S. PATENT DOCUMENTS 4,449,784 A     5/1984   Basov et al.
4,715,675 A * 12/1987   Kevern ................ G02B 6/3838
                                                           385/80
(Continued)

OTHER PUBLICATIONS

International Search Report and Written Opinion of co-pending International Application No. PCT/US2017/025397 dated Jun. 16, 2017.
(Continued)

*Primary Examiner* — Michelle R Connelly
(74) *Attorney, Agent, or Firm* — Leydig, Voit & Mayer, Ltd.

(57) ABSTRACT

A power insertion device includes: an input interface, configured for receiving a fiber connection from a fiber network; an output interface, comprising one or more hybrid cables for connection to one or more end devices, each of the hybrid cables including fiber for data communication and wire for power transmission; a mains power interface, configured to receive alternating current (AC) mains power; one or more power supplies, configured to convert the AC mains power to direct current (DC) power; and a power insertion board, configured to provide power insertion of the DC power out through the one or more hybrid cables.

17 Claims, 9 Drawing Sheets

Related U.S. Application Data a continuation-in-part of application No. 14/837,989, filed on Aug. 27, 2015, now Pat. No. 9,882,656, which is a continuation of application No. 14/836,600, filed on Aug. 26, 2015, now Pat. No. 10,171,180, which is a continuation-in-part of application No. 14/490,988, filed on Sep. 19, 2014, now abandoned.

(60) Provisional application No. 62/318,333, filed on Apr. 5, 2016, provisional application No. 61/880,030, filed on Sep. 19, 2013.

(51) Int. Cl.

| | | |
|---|---|---|
| *G02B 6/42* | (2006.01) | |
| *H04Q 11/00* | (2006.01) | |
| *H04N 5/232* | (2006.01) | |
| *H04N 5/63* | (2006.01) | |
| *H04N 21/443* | (2011.01) | |
| *H04L 25/02* | (2006.01) | |
| *H04B 10/073* | (2013.01) | |
| *H04B 10/077* | (2013.01) | |
| *H04B 10/272* | (2013.01) | |
| *H04L 12/64* | (2006.01) | |
| *G02B 6/38* | (2006.01) | |
| *G02B 6/44* | (2006.01) | |

(52) U.S. Cl.
CPC .......... *H04L 12/6418* (2013.01); *H04L 25/02* (2013.01); *H04N 5/23241* (2013.01); *H04N 5/63* (2013.01); *H04N 21/4436* (2013.01); *H04Q 11/0071* (2013.01)

(56) References Cited

U.S. PATENT DOCUMENTS

| | | | |
|---|---|---|---|
| 5,109,452 A | 4/1992 | Selvin et al. | |
| 5,242,315 A | 9/1993 | O'Dea | |
| 6,931,183 B2 | 8/2005 | Panak et al. | |
| 6,974,262 B1 | 12/2005 | Rickenbach | |
| 7,404,091 B1 | 7/2008 | Gere | |
| 8,502,733 B1 | 8/2013 | Negus et al. | |
| 8,935,543 B2 | 1/2015 | Hunter, Jr. et al. | |
| 9,742,704 B2 * | 8/2017 | Coffey | H04L 41/0803 |
| 2005/0229016 A1 | 10/2005 | Addy | |
| 2006/0089230 A1 | 4/2006 | Biederman et al. | |
| 2006/0093277 A1 | 5/2006 | Mulligan | |
| 2007/0116411 A1 | 5/2007 | Benton et al. | |
| 2010/0183262 A1 | 7/2010 | Caveney et al. | |
| 2010/0299544 A1 | 11/2010 | Hansalia | |
| 2010/0319956 A1 | 12/2010 | Ballard et al. | |
| 2010/0325324 A1 | 12/2010 | Aronson et al. | |
| 2014/0029899 A1 | 1/2014 | Isenhour et al. | |
| 2014/0072264 A1 * | 3/2014 | Schroder | H04J 14/00 385/76 |
| 2014/0147080 A1 | 5/2014 | Lambourn et al. | |
| 2014/0182124 A1 * | 7/2014 | Louderback | H04B 10/2581 29/825 |
| 2015/0003790 A1 | 1/2015 | Wu et al. | |
| 2015/0309271 A1 * | 10/2015 | Huegerich | G02B 6/4448 385/101 |
| 2016/0294475 A1 * | 10/2016 | Chappell | H04B 10/25752 |

OTHER PUBLICATIONS

U.S. Appl. No. 14/490,988, filed Sep. 19, 2014.
U.S. Appl. No. 14/837,989, filed Aug. 27, 2015.
U.S. Appl. No. 14/836,600, filed Aug. 26, 2015.
U.S. Appl. No. 15/233,112, filed Aug. 10, 2016.
U.S. Appl. No. 15/399,397, filed Jan. 5, 2017.
Extended EP Search Report for related European Patent Application No. 14846208.8, dated Feb. 6, 2017.
U.S. Appl. No. 15/233,312, filed Aug. 10, 2016.
International Search Report for co-pending International Application No. PCT/US2014/056506, dated Dec. 29, 2014 (20 pages).
International Preliminary Report and Written Opinion for co-pending International Application No. PCT/US2014/056506, dated Mar. 31, 2016 (13 pages).
Technical Specification Sheet "*PoE Extender over Hybrid Fiber*", *Level One*, retrieved from www.level1.com/oneworld_one_brand_one_Level, (3 pages).
Technical Specification Sheet, "*Hybrid Fiber Cable, 12/18 AWG*", *Level One*, retrieved from www.level1.com/oneworld_one_brand_one_Level, (2 pages).
Data Sheet, "*Hybrid Cable Assemblies*", *Fiber Connections Inc.*, retrieved from www.fiber.com, DS19-7-2011, (2 pages).
Technical Specification Sheet, *Universal Interface Component of TE's Powered Fiber Cable System*, retrieved from www.te.com/TelecomNetworks (4 pages) 2014.
Data Sheet, "*Ag5700—200W Powered Device Module*", V1.2, *Silver Telecom*, Aug. 2012. (14 pages).
"*Introduction to Power Over Hdbaset*", *HDBase T Alliance*, 2011, (6 pages).
Brochure entitled "*Powered Fiber Cable System*", *CommScope*, 2016, (6 pages).
OneReach™—PoE Extender System Brochure, "*Take PoE, PoE+, and now High PoE simplicity and gigabit capability to new distances*", *Berktek*, (12 pages), publication date unknown.
Article entitled: *Fiber Optic Cables, Reels, Converters/Extenderes, Breakout Boxes and Rackmount, Total Fiber Solutions*, www.camplex.com, (2 pages), publication date unknown.

\* cited by examiner

POWER INSERTION DEVICE FOR HYBRID FIBER AND POWER NETWORK

CROSS-REFERENCE TO RELATED APPLICATIONS

This patent application is a continuation-in-part of copending U.S. patent application Ser. No. 15/233,312 filed Aug. 10, 2016, which claims the benefit of U.S. Provisional Patent Application No. 62/318,333, filed Apr. 5, 2016. Both of these foregoing applications are incorporated herein by reference in their entireties.

This patent application is also a continuation-in-part of copending U.S. patent application Ser. No. 14/837,989, filed Aug. 27, 2015, which is a continuation of U.S. application Ser. No. 14/836,600, filed Aug. 26, 2015, which is a continuation-in-part of U.S. application Ser. No. 14/490,988, filed Sep. 19, 2014, which claims the benefit of U.S. Provisional Application No. 61/880,030, filed Sep. 19, 2013, all of which are incorporated herein by reference in their entireties.

BACKGROUND

Conventional copper-based networks that rely on Category cable (e.g. CAT 5, 6 or 7) are limited in the amount of power they can deliver via Power over Ethernet (PoE) and over what distance they can provide this power due to the limitation of the 28 AWG wires that are present in the cable. Even though multiple 28 AWG wires can be combined in the cable to deliver power, the power dissipation increases markedly as the current is increased and as the distance increases.

Also constraining the amount of power that can be delivered are the national international building standards that limit cable voltages to under 60 V DC. Otherwise, cabling must be treated as standard electrical power wiring which requires compliance with certain safety standards and licensed personnel for installation.

SUMMARY

In an exemplary embodiment, a power insertion device includes: an input interface, configured for receiving a fiber connection from a fiber network; an output interface, comprising one or more hybrid cables for connection to one or more end devices, each of the hybrid cables including fiber for data communication and wire for power transmission; a mains power interface, configured to receive alternating current (AC) mains power; one or more power supplies, configured to convert the AC mains power to direct current (DC) power; and a power insertion board, configured to provide power insertion of the DC power out through the one or more hybrid cables.

In another exemplary embodiment, a system includes: a network switch connected to a first end of a fiber connection; a power insertion device connected to a second end of the fiber connection, configured to provide optical routing with respect to channels of the fiber connection via one or more hybrid cables output from the power insertion device and to provide power insertion for the one or more hybrid cables; and one or more end devices connected to the power insertion device via the one or more hybrid cables, configured to receive data communications from fiber of the hybrid cable and receive power from wire of the hybrid cable.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

As discussed, for example, in U.S. application Ser. No. 14/837,989 filed Aug. 27, 2015, a hybrid fiber and power network which integrates ultra-high speed communications with low-voltage powering in a simple-to-deploy and reconfigurable network provides numerous advantages over conventional copper-based networks that rely on Category cable. For example, fiber networks provide EMI immunity, high data rates, and inherent security, and by using hybrid fiber and wire cables where the fiber is used for data delivery and the wire is used only for power transmission, constraints on the delivery of power based on the size of wire can be avoided relatively larger wire, such as 22 or 18 AWG, may be used, allowing power delivery pursuant to the 100 W UL standard for low power delivery). It will be appreciated that as used herein, "fiber(s)" refers to optical fiber(s) capable of data communications at high data rates.

Exemplary embodiments of the invention relate to power insertion devices that may be used in such hybrid fiber and power networks, which provide power insertion to hybrid fiber and power cables in a compact and easily reconfigurable manner. In order to minimize power losses, it is desirable to place the point of power insertion relatively close to the end user. In most situations, it is not difficult to find standard 110-120 V or 220-240 V AC outlets within 100 ft to 150 ft of end devices that will utilize power from the power insertion device. Thus, in certain exemplary implementations, the power insertion device may be located within approximately 100 ft to 150 ft (or, e.g., approximately 30 m to 50 m) of end devices. However, it will be appreciated that exemplary implementations in which the power insertion device is located farther from certain end devices (e.g., more than 50 m or even 500 m or more) are also possible. For example, in certain situations, such as with respect to critical powering networks, networks where AC is not proximately available, or networks where battery backup for a specific part of the network is desired, the power insertion device may be located at a further distance using lower AWG wire.

Figure 1A:
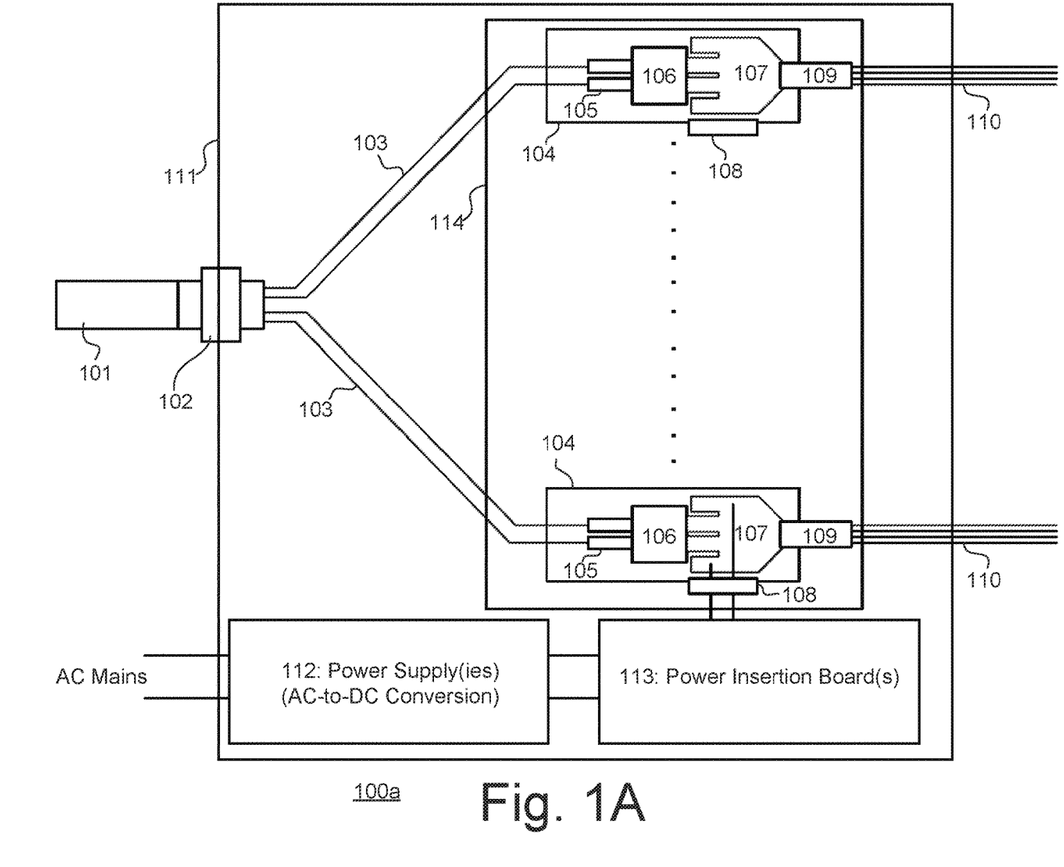
FIGS. 1A-1B are diagrams illustrating components of a power insertion device in exemplary embodiments.

FIG. 1A is a block diagram illustrating components of a power insertion device 100a in an exemplary embodiment.

A fiber connection 101 from a network is input into a housing 111 of the power insertion device 100a via one or more bulkhead connectors 102. In one exemplary implementation, the fiber connection 101 may include one or more multi-fiber cables containing, for example, up to 24 or 48 fibers connected to one or more multi-fiber bulkhead connectors (e.g., Multi-fiber Push On (MPO) multi-fiber bulkhead connectors).

In another exemplary implementation, the input fiber connection may be a single fiber connection for which time division multiplexing and multiple access techniques are used, with a splitter being provided at the power insertion device to split the single fiber into N individual fibers (such as 16 or 32 fibers) corresponding to N end devices or users, such as in a passive optical LAN (POL) or passive optical network (PON) architecture.

The housing 111 may be, for example, an enclosure having a size of 1 rack unit (RU).

A plurality of bi-directional fiber links 103 connect from the bulkhead connector 102 to a plurality of interface cards 104, each interface card 104 in this example corresponding to one bi-directional link 103 having two fibers. The interface card 104 includes a board which provides a removable fiber connection and power insertion through a dual bulkhead connector 106. Each interface card 104 further includes an electrical connector 108. One or more fiber connectors 105 (e.g., of LC or SC or other types) allow a bi-directional fiber link 103 to be connected to a fiber bulkhead connector 106, and the electrical connector 108 provides power to each interface card 104. It will be appreciated that although FIG. 1A shows a pair of fibers for each bi-directional fiber link 103 connected to two corresponding fiber connectors 105 (e.g., as would be present in an LC-based system), other exemplary implementations may utilize a single fiber for each bi-directional link 103 that connects to a single corresponding fiber connector 105 (e.g., as would be present in an SC-based system), where two different wavelengths are used over the single fiber for providing the bi-directional link 103.

A connector assembly 107 at the end of a hybrid fiber (for data) and wire (for power) cable 110 (shown without the cable sheath), with a strain relief 109, is connected to the dual bulkhead connector 106 and receives power from the interface card 104 so as to provide power and enable data communications via respective wires and fibers of the hybrid cable 110 (shown without the cable sheath). Examples of connector assemblies that may be used are described in U.S. patent application Ser. No. 15/233,312 filed Aug. 10, 2016.

The plurality of interface cards 104 are connected to a distribution board 114 which distributes power for each interface card 104 via respective electrical connectors 108. The electrical connectors 108 may be, for example, backplane connectors which not only provide power to the interface card 104, but also provide mechanical support to the interface card 104 for holding each interface card 104 vertically in place within the housing 111. Each interface card 104 may correspond, for example, to a respective channel, with N number of interface cards 104 providing up to N channels.

The source of the power may be, for example, AC mains power (e.g., 110-120 or 220-240 V AC) which is input into one or more power supplies 112 of the power insertion device 100a. The power supply(ies) 112 convert the AC mains power to DC power and reduce the high AC line voltage to a relatively low DC voltage (e.g., 110-120 or 220-240 V AC to 60 V DC). The reduced DC voltage is provided to one or more power insertion boards 113, which may be power sourcing equipment (PSE) board(s) (e.g., PoE++ PSE multichannel board(s) having 24 channels). The power insertion board(s) 113 provide power (e.g., PoE power at 55 V) for the output hybrid cables 110 via the distribution board 114 and the interface cards 104.

Alternatively or in combination with the provision of PoE-compliant power, universal serial bus (USB)-compliant power or power pursuant to other power transmission protocols may also be provided by the one or more power supplies 112 and/or the power insertion board(s) 113. Other exemplary power transmission protocols include but are not limited to, for example, proprietary powering protocols for powering systems for low voltage lighting and the EMerge Alliance Standard for low voltage DC power in commercial interiors.

Figure 1B:
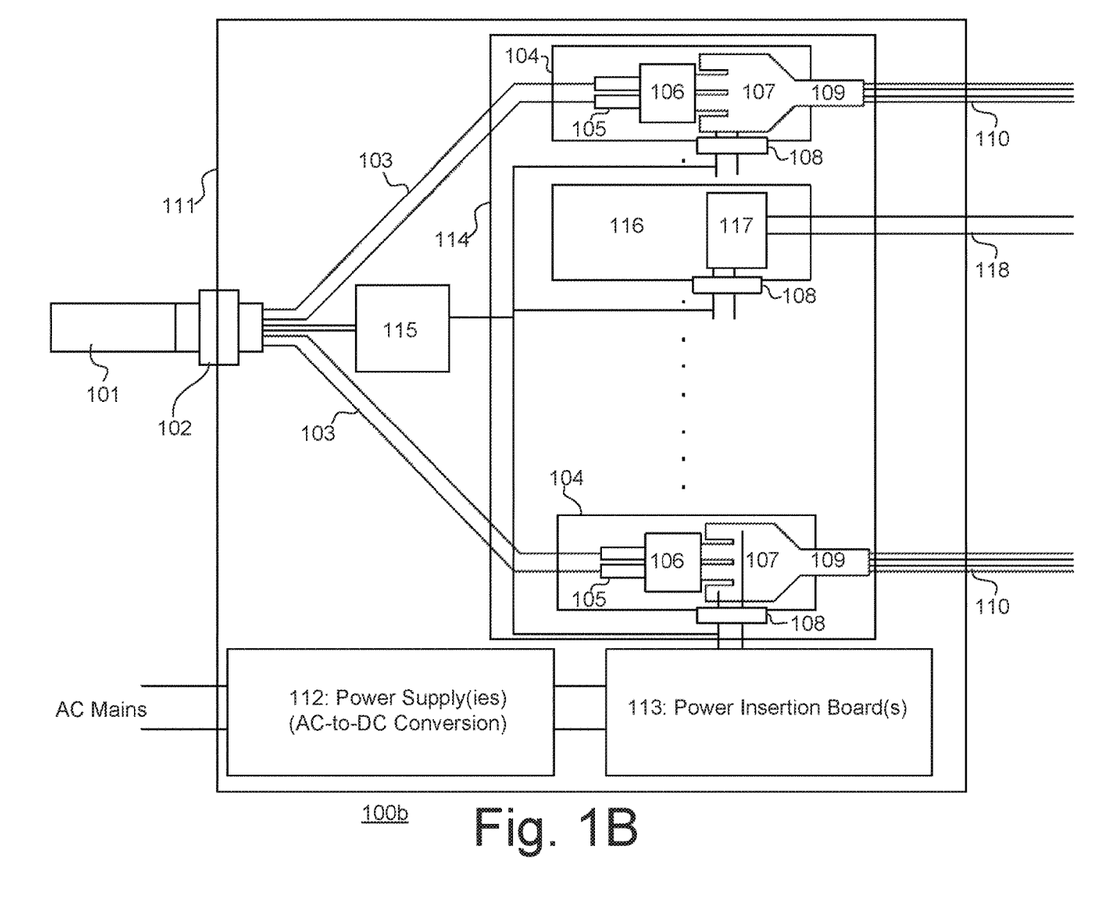

FIG. 1B is a block diagram illustrating components of a power insertion device 100b in another exemplary embodiment. As discussed, for example, in U.S. application Ser. No. 14/837,989 filed Aug. 27, 2015, there are situations where certain end devices may only need power (and do not need data) or may utilize a low data-rate channel over electrical wires (together with the provision of power) such that fiber connections need not be provided to all end devices. For example, in a drop ceiling environment, control signals for certain devices such as security cameras, wireless access points, motion sensors, building monitors, lighting, etc. may be provided through electrical wires through low data rate signaling without the need for running fiber to those devices. Thus, for such devices, instead of using an interface card 104 that connects to an output hybrid cable 110 having both fiber and wire connections, an interface card 116 that connects to an output cable 118 having only wire connections may be used.

As shown in FIG. 1B, a bi-directional fiber link 103 may be connected to an optical-to-electrical conversion board 115 that includes a fiber optic transceiver, a media converter, and electronics which provide a low data rate signaling scheme for 18 AWG or 22 AWG wires (e.g., a modulator). The optical-to-electrical conversion board 115 is connected to an interface card 116 having an electrical-only connector 117 which connects to an electrical-only (wire-only) cable 118 (shown unsheathed). Like the interface card 104 discussed above, the interface card 116 is supplied with power (e.g., 55 V DC PoE power) via the distribution board 114. The low data rate modulation signal generated by the optical-to-electrical conversion board 115 is mixed with the power and provided over the electrical-only cable 118 together with the PoE power.

It will thus be appreciated that in the exemplary embodiment shown in FIG. 1B, the power insertion device 100b may service a mix of end devices that utilize high-rate data communications over fiber and/or power over wires, end devices that utilize low-rate data communications over wires and/or power over wires, and/or end devices that only utilize power over wires.

It will further be appreciated that a single optical-to-electrical conversion board 115 may provide optical-to-electrical conversion and generate low data rate signaling for multiple interface cards 116 having electrical-only connectors 117 which connect to respective electrical-only cables 118. This may be achieved through a one-to-many broadcast scheme as shown in FIG. 1B (e.g., where the same low data rate signaling is broadcast along a bus to all interface cards), or alternatively through a one-to-one communication scheme using appropriate switching (not depicted) where low data rate signaling for a particular interface card 116 is only communicated to that particular interface card 116.

Because the optical-to-electrical conversion board 115 is connected to the fiber network via, a bi-directional fiber link 103 from the input fiber connection 101, it will be appreciated that the optical-to-electrical conversion board 115 may further be used for the network to communicate with the power insertion device 100b (e.g., commands intended for the power insertion device 100b may be received via the optical-to-electrical conversion board 115, and information about the power insertion device 100b may be sent to the network via the optical-to-electrical conversion board 115).

It will thus be appreciated that the power insertion device 100b supplies power from a power source (such as a mains 110-120 V or 220-240 V AC power source) to a plurality of hybrid fiber/wire cables and/or wire-only cables (which may be, for example, connected to connection interface devices and/or end user devices). A fiber connection 101 is input to the power insertion device 100b, with a plurality of hybrid cables 110 and/or wire-only cables 118 being output from the power insertion device 100b. The power insertion device 100b is thus able to provide fiber fan out and power added functionality for a large number of end devices of different types, with high power levels achievable per port (e.g., in the 90-100 W range).

In the exemplary embodiments depicted in FIGS. 1A and 1B, the plurality of fibers of the input fiber connection 101 interface with the output hybrid cables 110 (and/or wire-only cables 118) through one or more interface cards having appropriate components for making the data connections and providing power insertion. In other exemplary embodiments, instead of using interface cards, the connection interface in the power insertion device may utilize a connector or mechanical splice tray which utilizes mechanical splicing or conventional fiber connectors (e.g., bare fiber mechanical splices; SC-SC connections with bulkheads; and/or LC-LC connections with bulkheads). In any case, each channel of the input fiber connection is patched through to a respective hybrid power/fiber cable (or wire-only cable) output from the power insertion device.

In an exemplary implementation, the power insertion may be accomplished, for example, through Linear Technology's LTPoE++ standard (or, in other exemplary implementations, according to other PoE protocols). For example, a power insertion controller of a power insertion board may be a 12-channel LTPoE++ Controller which is configured to provide power insertion for up to 12 separate outputs connecting to up to 12 hybrid power/fiber cables. The 12-channel LTPoE++ Controller may utilize the LTPoE++ PSE Controller Chipset, and further details regarding the components and operation of the LTPoE++ PSE Controller Chipset may be found in Linear Technology, "LTPoE++/PoE+/PoE PD Controller," Datasheet 4275f, available at http://www.linear.com/product/LT4275, which is incorporated herein by reference.

In an exemplary implementation, a power insertion controller, as well as a printed circuit board (PCB) to which the power insertion controller is mounted, provides full PoE regulation (e.g., at 48 V) to each of the output cables such that no additional regulation is needed further down the line (e.g., at a connection interface device and/or an end user device), even with powers up to 90 W in LTPoE++ applications.

In an exemplary implementation, a power supply of the power insertion device, which may be connected to the mains power source, may be configured to provide 48-55 V DC and 200-1000 W based on a 110 V AC and up to 20 A input. The power supply may further provide for a degree of statistical multiplexing for the client devices such that the power supply can be appropriately sized to accommodate power provisioning on all lines without needing to be so large as to simultaneously provide 90 W on every line.

It will be appreciated that the copper wires (e.g., 18 AWG or 22 AWG) can be clipped to the PCB. Further, to the extent that an end device (e.g., a high-wattage TV) requires more than the power level achievable via a single hybrid cable, multiple hybrid cables may be used to supply the end device with the requisite power (e.g., a connection interface device connected to the high-wattage TV may take as input two hybrid fiber/power cables, one of which is used for both data and power, and the other of which is used for only power). Thus, various types of end devices, ranging from standard PoE devices requiring less than 30 W of power, to more power-hungry devices such as laptop charging stations and high-wattage TVs can all be flexibly provisioned using exemplary embodiments of the power insertion device. In one exemplary embodiment, multiple devices of an office or a cubicle are all supplied with power by cables running from a single power insertion device.

In an exemplary implementation, the power insertion device is a compact unit that provides clean fiber management, with strain reliefs being incorporated at both the input and output sides where input fibers and output hybrid cables are connected. In a certain exemplary implementation, the power insertion device fits within a standard 19" wide rack mount where the enclosure is less than 24" long and under 2 rack units (1RU=1.75") tall. The power insertion device thus fits within a local data closet or may be placed into a specialized and/or standardized ceiling, floor or wall cabinet space.

Figure 2:
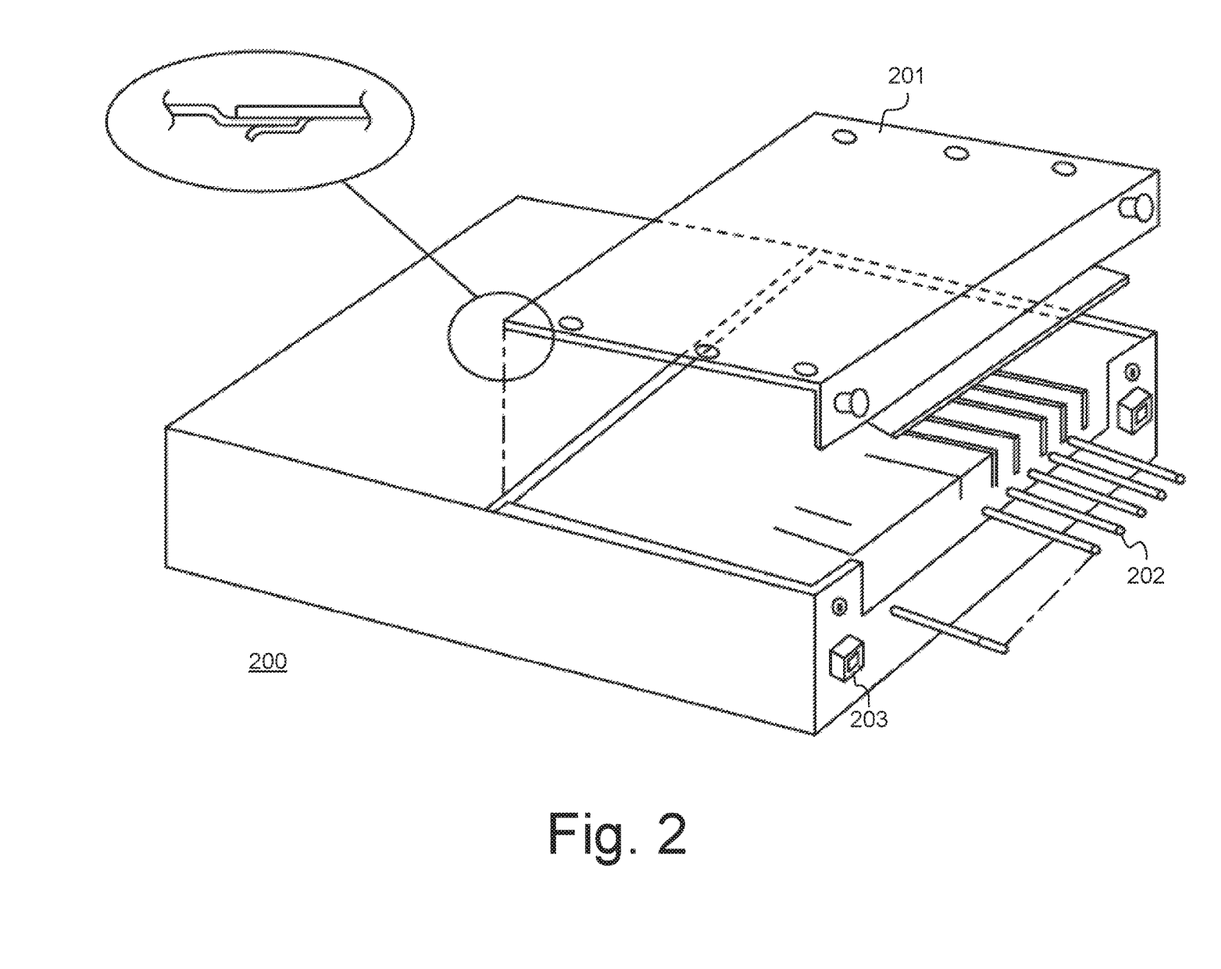
FIG. 2 is a schematic diagram illustrating the housing for a power insertion device in an exemplary embodiment with a lid of the housing raised.

FIG. 2 is a schematic diagram illustrating a housing for a power insertion device 200 in an exemplary embodiment with a lid 201 of the housing raised. One or more fiber connections (e.g., multi-fiber cables) are connected to bulkhead connector(s) 203 on the housing and are separated into multiple 1-2 fiber channels. The fibers of these 1-2 fiber channels are then joined to fibers in output hybrid fiber/wire cables 202 that connect the power insertion device 200 to individual end client devices such as computers, laptops, security cameras, wireless access points, monitors and/or televisions. The bulkhead connector(s) 203 may be, for example, MPO bulkhead connectors or other types of multi-fiber connectors (e.g., MU, MPT, etc.).

Due to the high density of connections within the power insertion device 200, the lid 201 is configured as a lift-up lid that allows interface cards within the power insertion device 200 to be lifted out from the housing such that the difficulty of making and rearranging both fiber and electrical connections is greatly reduced. For example, in an exemplary implementation, the lid 201 may comprise an interlocking portion that acts as a hinge in combination with the housing of the power insertion device 200.

Figure 3:
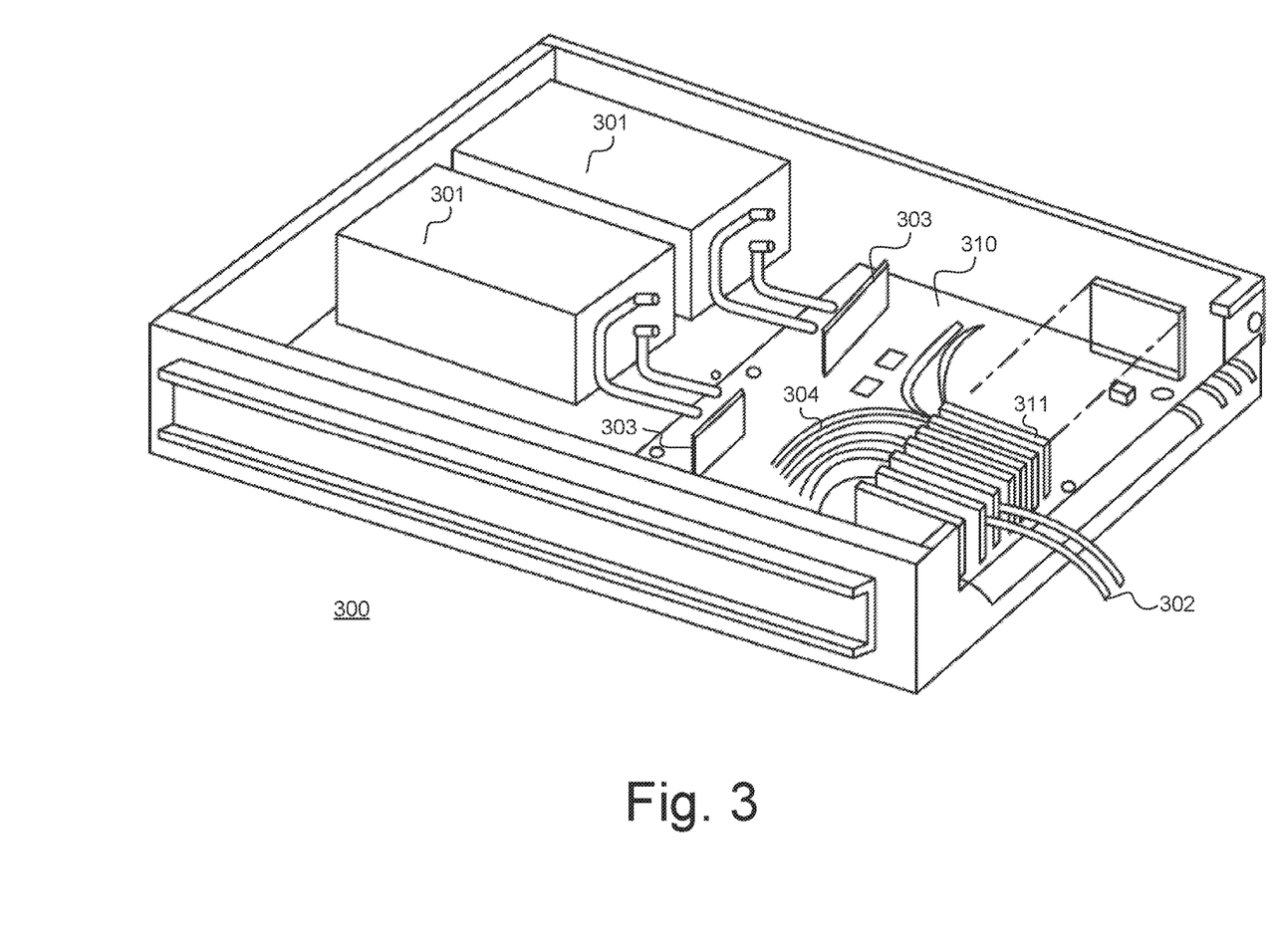
FIG. 3 is a schematic diagram illustrating a power insertion device in an exemplary embodiment without the lid of the housing to show exemplary components inside the housing.

FIG. 3 is a schematic diagram illustrating a power insertion device 300 in an exemplary embodiment without the lid of the housing to show exemplary components inside the housing. In the exemplary implementation depicted in FIG. 3, the power insertion device includes two power supplies 301. These power supplies may be, for example, dual 1100 W power supplies that convert 110-120 V or 220-240 V mains AC power to 60 V DC power, which is delivered as PoE-compatible power over the hybrid fiber/wire cables 302 of the hybrid data/power system. The power insertion device 300 further includes multi-channel Power Sourcing Equipment (PSE) circuitry 303, such as two Linear Technology Corporation (LTC) 4270 PCBs, which provide power conditioning and control intelligence pursuant to one or more PoE standards.

Further, in the exemplary implementation depicted in FIG. 3, the fiber connection input into the power insertion device 300 is routed through fan-out fiber cables 304, and the fibers of the fan-out fiber cables 304 and the fibers of the hybrid cables 302 are brought together in multiple individual interface cards 311 that plug into a backplane 310. The PSE circuitry 303 thus provides power insertion into the hybrid cables 302 via the backplane 310 and the interface cards 311. As mentioned above, the hybrid cables 302 provide fiber and wire outputs to end devices (or interface devices connected to the end devices) of the data/power network from the power insertion device 300.

It will be appreciated that in this exemplary implementation, there is one hybrid cable 302 and one bi-directional fiber link that corresponds to each individual interface card 311, but in other exemplary implementations, there may be more than one hybrid cable 302 and/or more than one bi-directional fiber link per interface card 311.

In an exemplary implementation, the fan-out fiber cables 304 may be MPO-LC fan-out cables (e.g., or MU to LC or MPT to LC fan-out cables).

Figure 4:
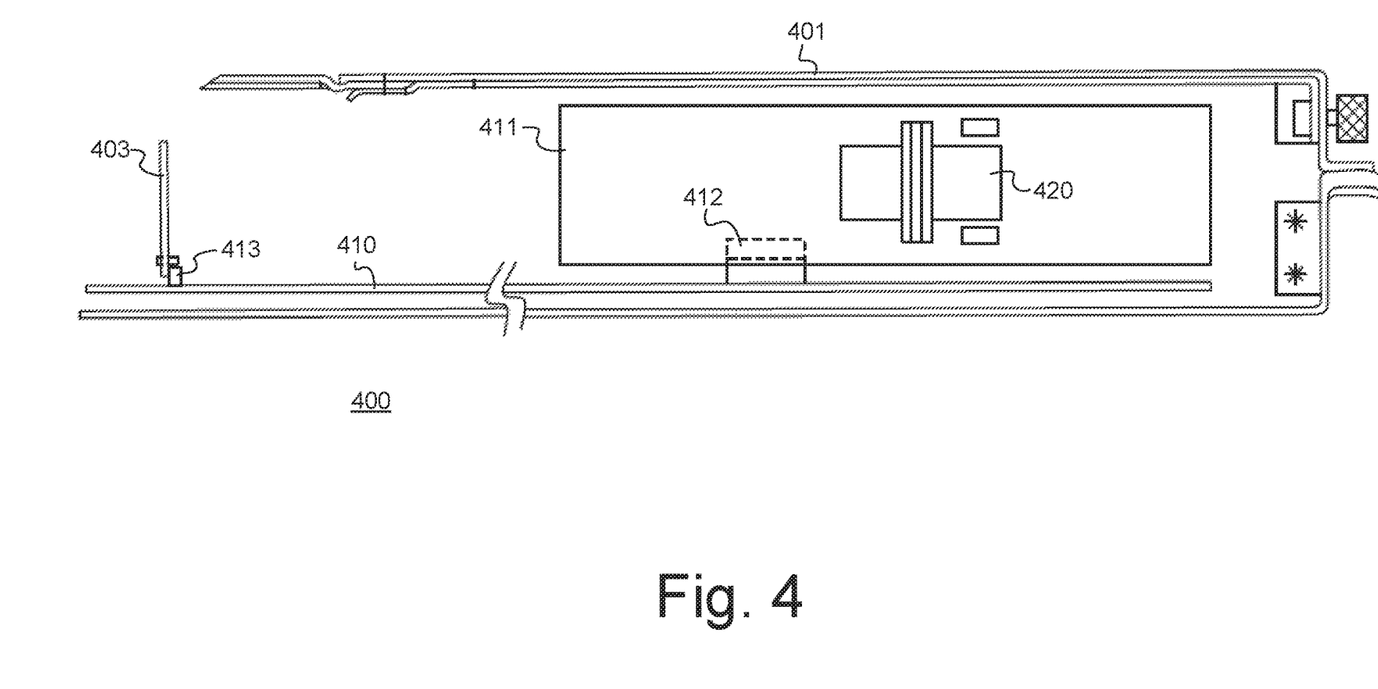
FIG. 4 is a schematic diagram illustrating a cross-section of the power insertion device in an exemplary embodiment.

FIG. 4 is a schematic diagram illustrating a cross-section of a power insertion device 400 in an exemplary embodiment. As illustrated in FIG. 4, interface cards 411 are held perpendicularly relative to the backplane 410 and the bottom of the housing. The interface cards 411 are held in place on the backplane 410 by one or more backplane connectors 412 (which hold the card up in a mechanically rigid manner, allow for unplugging and plugging, and provide electrical connections). In an exemplary implementation, each interface card 411 includes a dual bulkhead connector 420 which includes a sleeve (e.g., a ceramic sleeve) for holding two fiber ferrules in the correct alignment. The dual bulkhead connector 420 may be, for example, a Molex P/N 106115-1100 or Molex SD-106115-110.

FIG. 4 also shows exemplary PSE circuitry 403, which for example may include a 12-port PSE daughter card such as the LTC 4270. The PSE circuitry 403 may also be held perpendicularly relative to the bottom of the housing by one or more backplane connectors 413 providing mechanical support and electrical connections in a removable manner.

The interface cards 411 and PSE circuitry 403 are configured so as to be pluggable into and removable from the respective backplane connectors. The power insertion device 400 thus provides high spatial density, which allows for a large number of hybrid cable channels to be accommodated within the space of the housing. Further, the plug-in nature of the interface cards 411 allows for convenient access to the fiber/wire connections on the interface cards 411 based on opening the lid 401 of the housing.

Figure 5A:
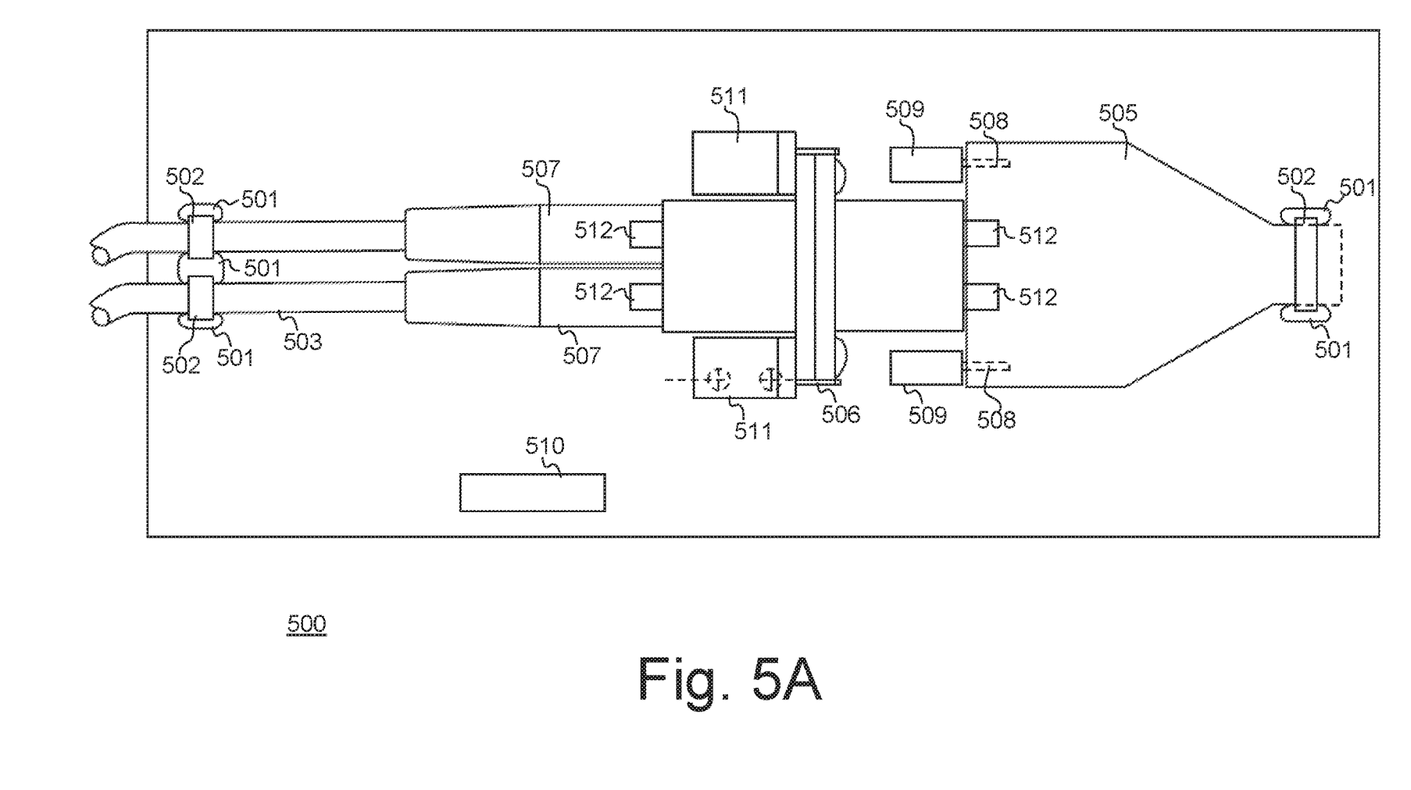
FIGS. 5A-5C are schematic diagrams illustrating multiple views of an individual interface card in an exemplary embodiment.
Figure 5B:
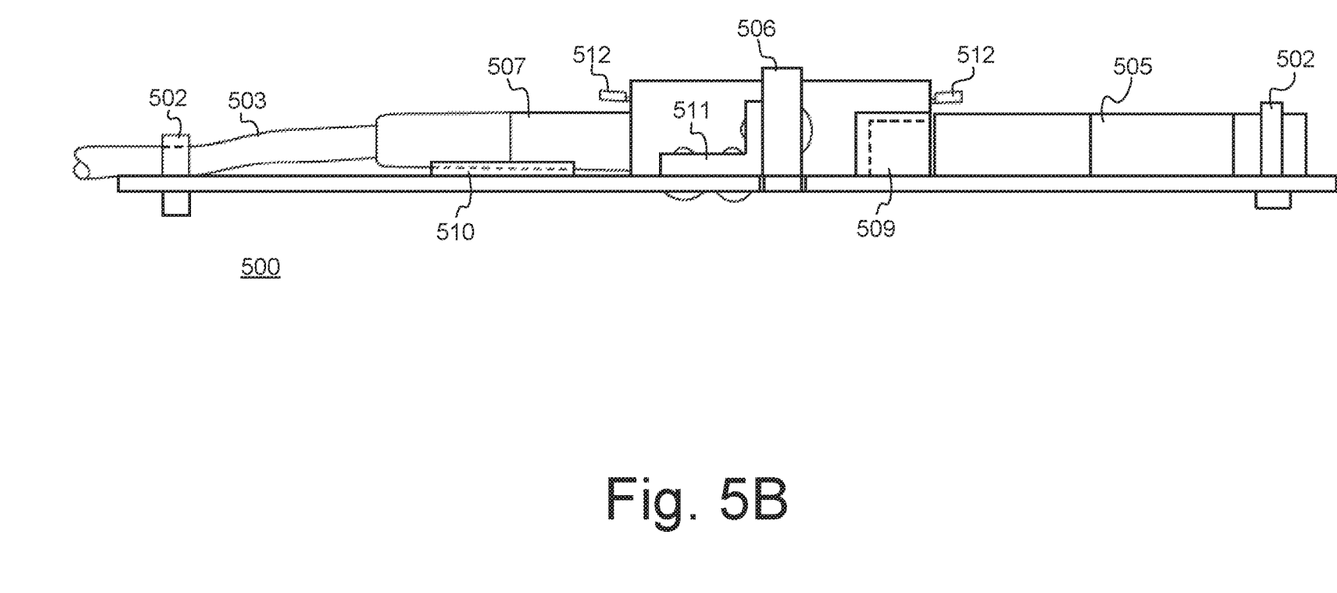
Figure 5C:
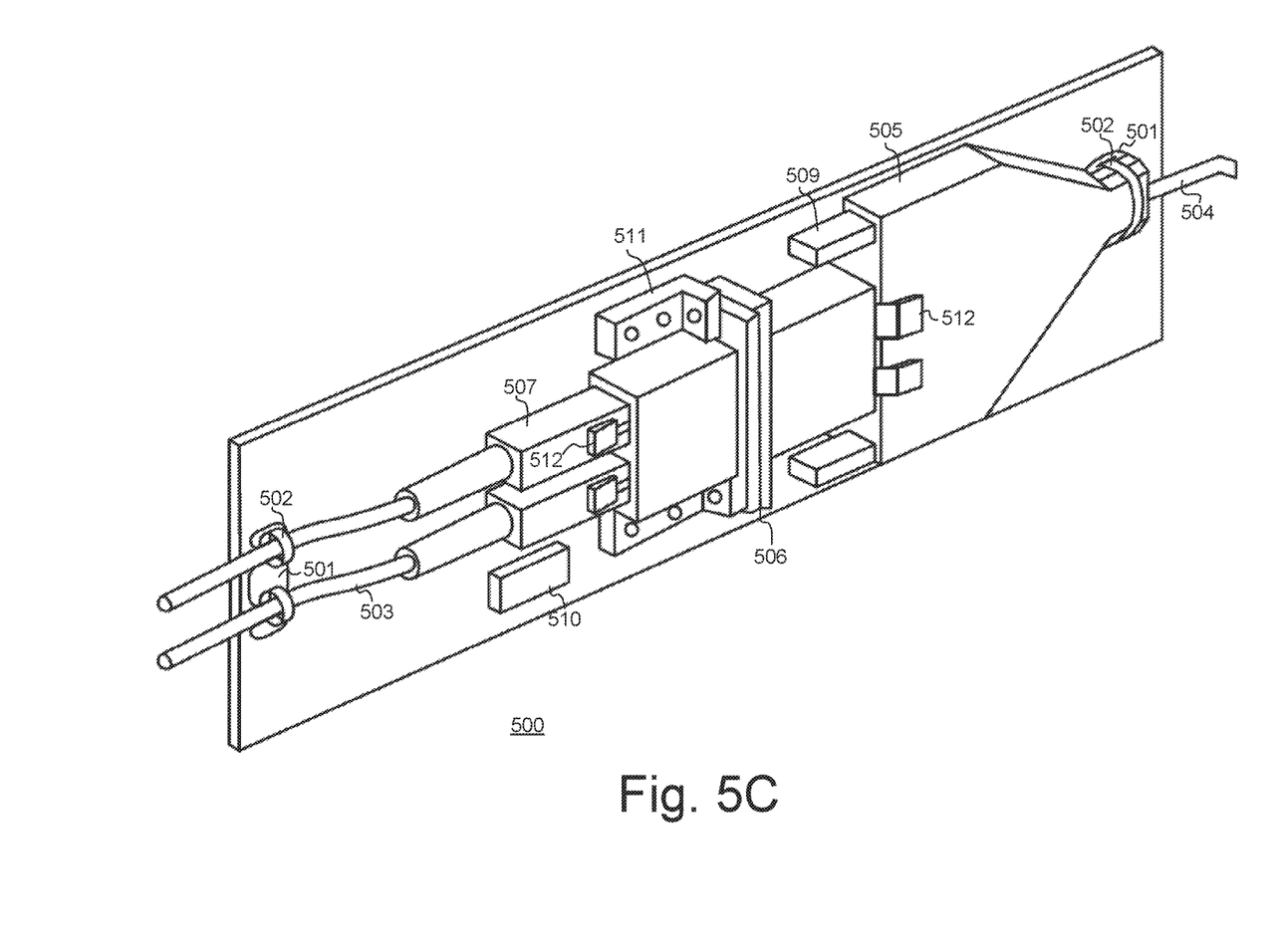

FIGS. 5A-5C are schematic diagrams illustrating multiple views of an individual interface card 500 in an exemplary embodiment. The interface card 500 provides, for example, a fiber/wire interface PCB upon which other components are attached.

The interface card 500 includes slots 501 for cable ties 502 to hold fiber cables 503 and hybrid cable 504 in place. Additionally, the hybrid cable 504 has a connector assembly 505, for example, as described in U.S. patent application Ser. No. 15/233,312 filed Aug. 10, 2016.

Fibers of the hybrid cable 504, via connector assembly 505, are connected to a dual bulkhead assembly 506 on the interface card 500. Additionally, fibers of the fiber cables 503, via connectors 507 (e.g., MU-LC fanout connectors), are also connected to the dual bulkhead assembly 506 on the interface card 500. The dual bulkhead assembly 506 may be, for example, a Molex P/N 106115-1100 or Molex SD-106115-1100. In an exemplary implementation, two LC connectors from a multi-fiber MPO connector are connected to an LC connector assembly through a dual LC bulkhead adaptor which contains ceramic sleeves in which the fibers from the multi-fiber MPO connector side and the fibers of the LC connector assembly side make low loss optical contact.

Wires of the hybrid cable 504 are connected to a corresponding power interface on the interface card 500, which may include for example, contact blades 508 and contact blade housings 509. Power is provided from the interface card 500 to the connector assembly 505 and hybrid cable 504 via the contact blades 508, which are mated with respective slots of the connector assembly 505. In an exemplary implementation, on the interface card are electrical connections that connect the PSE through a backplane connector to the male connectors (e.g., the contact blades), which are plugged into the power sockets of an LC connector assembly.

In the exemplary implementation depicted in FIGS. 5A-5C, the interface card 500 further includes a backplane connector 510, which attaches the interface card 500 to the distribution board or backplane. The backplane connector 510 may be for example a SAMTEC TMH-105-01-F-S-RA.

FIGS. 5A-5C further depict bulkhead brackets 511 for mounting the dual bulkhead assembly 506 to the interface card 500, and release latches 512 which are configured to be pushed down to enable the fiber connectors to be pulled out of the dual bulkhead assembly 506.

It will be appreciated that although FIGS. 5A-5C depict an LC-based system where two LC connectors interface with an LC connector assembly, other types of fiber connector configurations may be used, such as in an SC-based system where a single bi-directional fiber (corresponding to a single SC connector) may be used instead of a pair of fibers (corresponding to two LC connectors) as depicted in FIGS. 5A-5C.

It will be appreciated that each interface card can easily be removed from the power insertion device, with the connectors being mated and/or un-mated while the card is removed. The interface cards may then be put back into the power insertion device in a manner that achieves a high density of fiber/wire interconnects within the power insertion device. Thus, by using the interface cards described herein to connect input multi-fiber cables to output hybrid power/fiber cables having hybrid power/fiber connector assemblies, power insertion in an integrated data and power system may be achieved in an efficient, user-friendly, and reconfigurable manner through power insertion devices according to exemplary embodiments of the invention.

Figure 6:
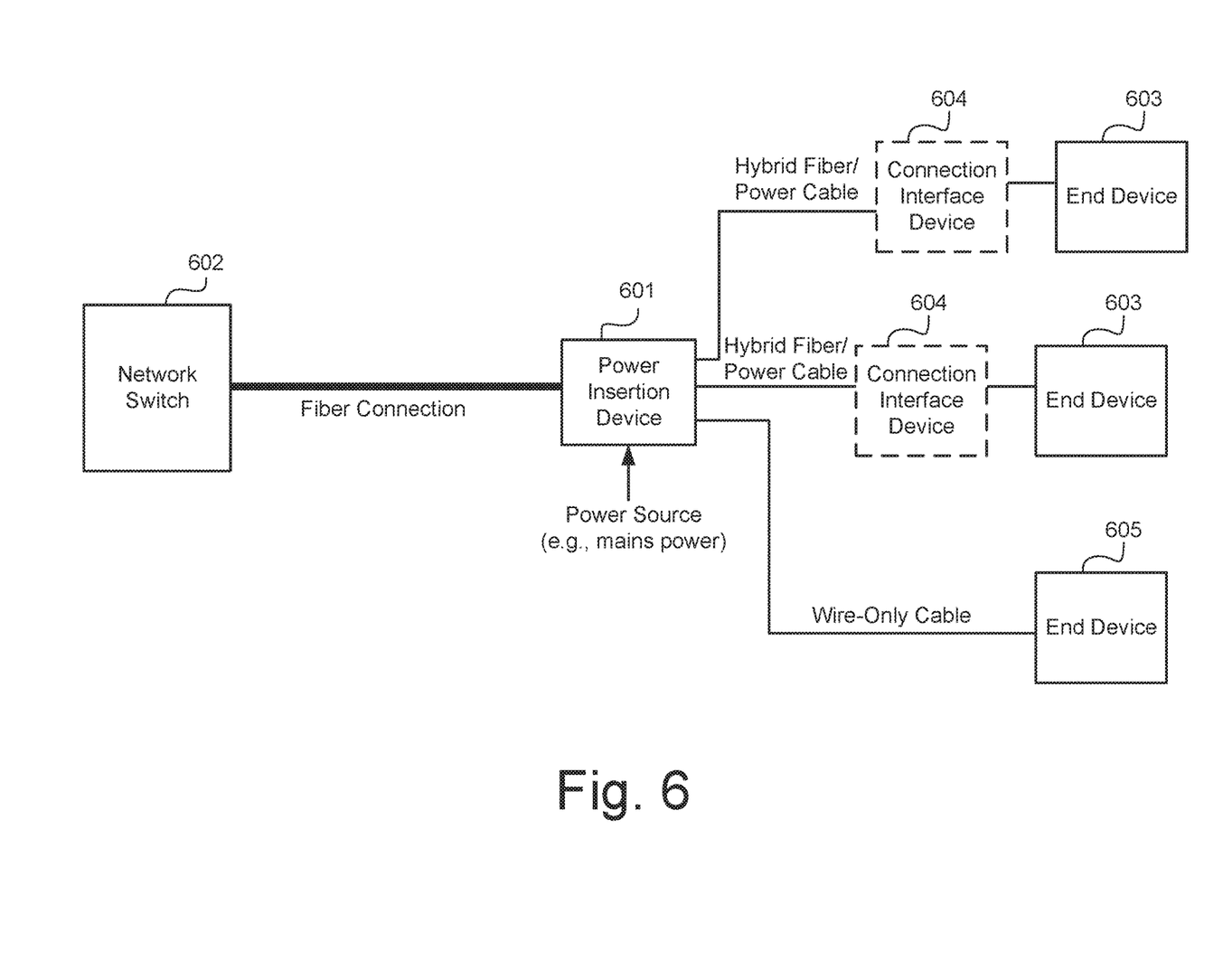
FIG. 6 is a block diagram illustrating a hybrid fiber and power network in which a power insertion device may be used in an exemplary embodiment.

FIG. 6 is a block diagram illustrating a hybrid fiber and power network in which a power insertion device 601 may be used in an exemplary embodiment. The power insertion device 601 may provide passive optical routing functionality with respect to a fiber connection received from a network switch 602 by connecting respective channels of the fiber connection to respective hybrid fiber/power cables which are routed to end devices 603 (wherein the routing may include connection interface devices 604 connected to the end devices 603). The power insertion device 601 also provides for mid-span power insertion, allowing the hybrid fiber/power cables to be used to power the end devices 603 and/or the connection interface devices 604. Further, with respect to end devices 605 that do not need data or that are able to utilize low data rate signaling, the power insertion device 601 may provide power insertion and/or optical-to-electrical conversion for low data rate signaling along wire-only cables.

It will be appreciated that the power insertion device may be located near a power source (such as AC mains power) relative close to the end devices (e.g., within 30 meters) so as to achieve efficient powering through hybrid data/power cables over short distances with low voltage drops, and which avoids the need for end devices to be plugged into respective mains power sources themselves. At the same time, the power insertion device provides an interface to a fiber-based network where fiber connections are used for high-rate data transfer over long distances (e.g., 300 to 500 meters or more), with individual data connections being routed from the power insertion device to respective end devices.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A power insertion device, comprising:
   an input interface, configured for receiving a fiber connection from a fiber network;
   an output interface, comprising one or more hybrid cables for connection to one or more end devices and one or more wire cables for connection to one or more additional end devices, each of the hybrid cables including fiber for data communication and wire for power transmission;
   a mains power interface, configured to receive alternating current (AC) mains power;
   one or more power supplies, configured to convert the AC mains power to direct current (DC) power; and
   a power insertion board, configured to provide power insertion of the DC power out through the one or more hybrid cables;
   wherein the power insertion device further comprises an optical-to-electrical conversion board, configured to generate low data rate signaling for at least one of the one or more wire cables based on signaling received from a fiber input to the optical-to-electrical conversion board.

2. The power insertion device according to claim 1, wherein each of the one or more hybrid cables includes a connector assembly configured to provide optical and electrical connections, and wherein the power insertion device further comprises:
   a plurality of interface cards to which connector assemblies of the one or more hybrid cables are connected, wherein the power insertion to the one or more hybrid cables provided by the power insertion board is provided via the plurality of interface cards.

3. The power insertion device according to claim 2, wherein each connector assembly corresponds to a respective interface card.

4. The power insertion device according to claim 2, wherein each interface card is configured to be removable from the power insertion device via a pluggable electrical connector, so as to allow a connector assembly to be connected to or disconnected from an interface card while the interface card is outside a housing of the power insertion device.

5. The power insertion device according to claim 4, wherein the housing of the power insertion device includes a removable lid.

6. The power insertion device according to claim 2, wherein the fiber connection comprises a plurality of channels corresponding to a plurality of bi-directional fiber links, wherein each bi-directional fiber link is connected to a respective interface card.

7. The power insertion device according to claim 6, wherein each interface card includes a dual bulkhead connector configured to interface with one or more fiber connectors corresponding to a bi-directional fiber link and to interface with one or more fiber connectors of a connector assembly of a hybrid cable.

8. The power insertion device according to claim 7, wherein the dual bulkhead connector comprises release latches for each fiber interface of the dual bulkhead connector.

9. The power insertion device according to claim 2, further comprising:
   a power distribution backplane, wherein the plurality of interface cards are mounted on the power distribution backplane via respective electrical connectors, and wherein the power insertion to the one or more hybrid cables provided by the power insertion board is provided via the power distribution backplane and the plurality of interface cards.

10. The power insertion device according to claim 1, wherein the power insertion board is power sourcing equipment (PSE), configured to provide Power over Ethernet (PoE)-compliant power.

11. The power insertion device according to claim 1, wherein each of the one or more hybrid cables includes a connector assembly configured to provide optical and electrical connections;
   wherein the power insertion device further comprises:
   one or more interface cards to which connector assemblies of the one or more hybrid cables are connected, wherein the power insertion to the one or more hybrid cables provided by the power insertion board is provided via the one or more interface cards to which connector assemblies of the one or more hybrid cables are connected; and
   one or more interface cards to which the one or more wire cables is connected, wherein the power insertion board is further configured to provide power insertion of the DC power out through the one or more wire cables via the one or more interface cards to which each of the one or more wire cables is connected.

12. The power insertion device according to claim 1, wherein the optical-to-electrical conversion board comprises a fiber optic transceiver and a media converter.

13. The power insertion device according to claim 1, wherein the DC power has a reduced voltage relative to the AC mains power.

14. A system, comprising:
   a power insertion device connected to a second end of a fiber connection, configured to provide optical routing with respect to channels of the fiber connection via one or more hybrid cables output from the power insertion device and to provide power insertion for the one or more hybrid cables; and
   one or more end devices connected to the power insertion device via the one or more hybrid cables, configured to receive data communications from fiber of the hybrid cable and receive power from wire of the hybrid cable;
   wherein the power insertion device is further configured to provide optical-to-electrical conversion for signals received via the fiber connection and to output low data rate signaling via one or more wire cables output from the power insertion device based on the signals received via the fiber connection, and to provide power along the one or more wire cables; and
   wherein the system further comprises one or more end devices connected to the power insertion device via the one or more wire cables.

15. The system according to claim 14, further comprising:
   a network switch connected to a first end of the fiber connection, wherein the distance between the power insertion device and the one or more end devices is less than the distance between the power insertion device and the network switch.

16. The system according to claim 14, further comprising:
   one or more connection interface devices, wherein at least one end device is configured to receive data communications from fiber of the hybrid cable and receive power from wire of the hybrid cable through a connection interface device of the one or more connection interface devices.

17. The system according to claim 14, wherein a power source for the power insertion device is mains power.

* * * * *